(12) United States Patent
Seikh et al.

(10) Patent No.: US 8,610,938 B2
(45) Date of Patent: Dec. 17, 2013

(54) REMOTE PRINT PREVIEW GENERATION

(75) Inventors: Attaullah Seikh, Irvine, CA (US);
Rajini Bala Giridharagopal, Irvine, CA (US); Ravichandran Ragunathan, Ladera Ranch, CA (US); Don Purpura, Yorba Linda, CA (US); Allan Roberto, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 13/205,522

(22) Filed: Aug. 8, 2011

(65) Prior Publication Data

US 2013/0038899 A1   Feb. 14, 2013

(51) Int. Cl.
*G06F 3/12* (2006.01)

(52) U.S. Cl.
USPC ......... 358/1.15; 358/1.13; 709/203; 709/217; 715/200; 715/274

(58) Field of Classification Search
USPC ......... 345/418; 358/1.1, 1.13, 1.15, 1.18, 1.9; 455/566; 700/235; 705/40; 709/203, 709/217; 710/62
See application file for complete search history.

(56) References Cited

U.S. PATENT DOCUMENTS

| | | | |
|---|---|---|---|
| 6,078,936 A * | 6/2000 | Martin et al. | 715/201 |
| 6,632,250 B1 * | 10/2003 | Lynch et al. | 715/210 |
| 6,738,841 B1 | 5/2004 | Wolff | |
| 7,295,336 B2 | 11/2007 | Yoshida et al. | |
| 7,570,380 B2 * | 8/2009 | Hart et al. | 358/1.15 |
| 7,647,074 B2 | 1/2010 | McCoog et al. | |
| 7,675,645 B2 | 3/2010 | Hara | |
| 7,760,379 B2 | 7/2010 | Owen | |
| 2002/0046238 A1 | 4/2002 | Estavillo et al. | |
| 2002/0138564 A1 * | 9/2002 | Treptow et al. | 709/203 |
| 2003/0142325 A1 * | 7/2003 | Leslie | 358/1.1 |
| 2004/0010756 A1 | 1/2004 | Hobbs | |
| 2004/0136020 A1 * | 7/2004 | Kumada | 358/1.9 |
| 2005/0131819 A1 * | 6/2005 | Aoki et al. | 705/40 |
| 2006/0129632 A1 | 6/2006 | Blume et al. | |
| 2007/0240042 A1 | 10/2007 | Sato | |
| 2008/0249657 A1 * | 10/2008 | Wendland et al. | 700/235 |
| 2009/0037812 A1 * | 2/2009 | Asai | 715/274 |

(Continued)

OTHER PUBLICATIONS

Microsoft SharePoint 2010 IT Professional Evaluation Guide (2010).

(Continued)

*Primary Examiner* — King Poon
*Assistant Examiner* — David S Cammack
(74) *Attorney, Agent, or Firm* — Fitzpatrick, Cella, Harper & Scinto (57) ABSTRACT

A print preview is displayed for a printer on a network. A selection of a document to be printed by the printer is accepted, and a request for the selected document is sent from the printer to a remote print preview service. There is a determination of whether the printer supports a native print preview function capable of displaying a visually acceptable print preview on a display unit of the printer. If the printer supports such a native print preview function, the printer requests the remote print preview service to generate a native print preview compatible with the capabilities of the printer and to transmit the generated native print preview to the printer. If the printer does not support such a native print preview function, the printer requests the remote print preview service to generate a print preview for an alternate display device, and to transmit the generated print preview to the alternate display device.

32 Claims, 8 Drawing Sheets

(56) References Cited

U.S. PATENT DOCUMENTS

| | | | |
|---|---|---|---|
| 2009/0043905 A1* | 2/2009 | Aoki et al. | 709/230 |
| 2009/0070666 A1* | 3/2009 | Eilers et al. | 715/240 |
| 2010/0097644 A1* | 4/2010 | Takahashi | 358/1.15 |
| 2011/0125806 A1* | 5/2011 | Park | 707/803 |
| 2011/0134466 A1* | 6/2011 | Nakagawa | 358/1.15 |
| 2011/0157215 A1* | 6/2011 | Aoyagi | 345/593 |
| 2011/0173188 A1* | 7/2011 | Walsh et al. | 707/722 |
| 2011/0179354 A1* | 7/2011 | Park | 715/274 |
| 2012/0268772 A1* | 10/2012 | Rolleston et al. | 358/1.15 |

OTHER PUBLICATIONS

Xerox WorkCentre 7120/7125 Multifunction Printer Brochure (updated Jun. 2011).

* cited by examiner

REMOTE PRINT PREVIEW GENERATION

FIELD

The present disclosure relates to generation of a print preview.

BACKGROUND

In the field of printing, it is common to provide a print preview of a document. Often, in network printing, a user may wish to view a print preview at a local printer, which may be located remotely from the user's PC. Conventional arrangements have addressed this need by providing for a print preview on the display of the printer itself.

SUMMARY

One problem with the above arrangements is that the local printer might lack capabilities to display a visually acceptable print preview. For example, the local printer may only display characters, and therefore might not be able to display a print preview at all. In another example, the local printer might have a graphic display, but may lack the resolution, size, or other capabilities to display the print preview with a visually acceptable quality.

The foregoing situation is addressed by generating a print preview for a remote alternate display device which is capable of displaying a visually acceptable print preview.

Thus, in an example embodiment described herein, a print preview is displayed for a printer on a network. A selection of a document to be printed by the printer is accepted, and a request for the selected document is sent from the printer to a remote print preview service. There is a determination of whether the printer supports a native print preview function capable of displaying a visually acceptable print preview on a display unit of the printer. In a case where the printer supports a native print preview function capable of displaying a visually acceptable print preview, the printer requests the remote print preview service to generate a native print preview compatible with the capabilities of the printer and to transmit the generated native print preview to the printer. In a case where the printer does not support a native print preview function capable of displaying a visually acceptable print preview, the printer requests the remote print preview service to generate a print preview for an alternate display device which supports print preview according to the capabilities of the alternate display device, and to transmit the generated print preview to the alternate display device.

By generating a print preview for a remote alternate display device which is capable of displaying a visually acceptable print preview, it is ordinarily possible to provide a print preview which is superior to a print preview available at the local printer (if any). Moreover, the remote alternate display device can be a portable device such as a cell phone, thereby allowing the user to view the print preview in various locations.

This brief summary has been provided so that the nature of this disclosure may be understood quickly. A more complete understanding can be obtained by reference to the following detailed description and to the attached drawings.

DETAILED DESCRIPTION

Figure 1:
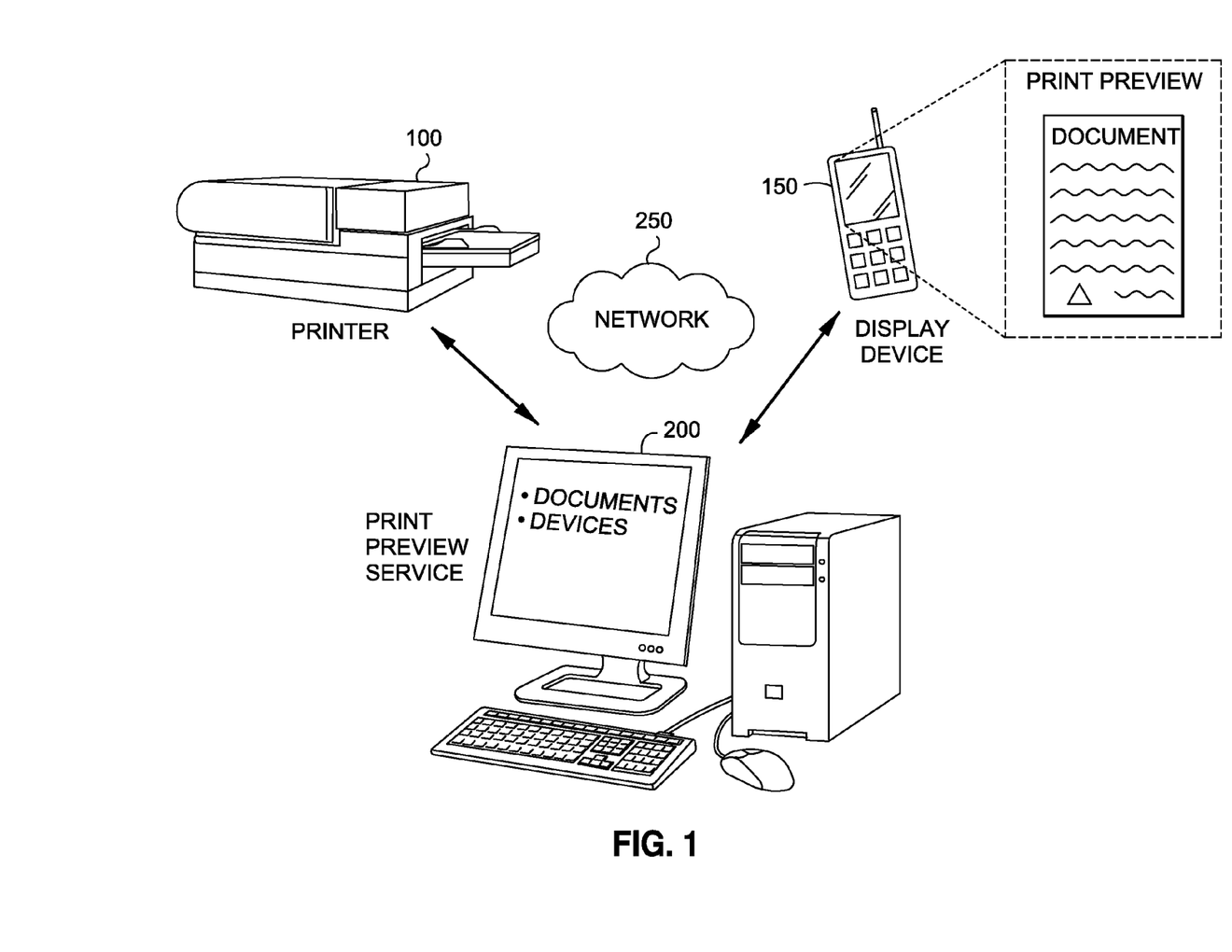
FIG. 1 is a representative view of an example environment in which aspects of the present disclosure may be practiced.

FIG. 1 illustrates an example environment in which aspects of the present disclosure may be practiced.

Printer 100 is used to produce a hard copy (permanent human-readable text and/or graphics) of a document stored in electronic form, usually on physical print media such as paper. In FIG. 1, printer 100 is depicted as a desktop printer. However, printer 100 could also be architected as a multi-function printer containing other elements such as a copier or scanner, or as a dedicated photo printer. Printer 100 could also be architected as a mechanically driven printer for large-format documents where a desktop design would be impractical.

In some embodiments, printer 100 might lack capabilities to display a visually acceptable print preview. For example, printer 100 may only display characters, and therefore might not be able to display a print preview at all. In another example, printer 100 might have a graphic display, but may lack the resolution, size, or other capabilities to display the print preview with a visually acceptable quality.

Computer 200 hosts a print preview service, and generally comprises a programmable general purpose personal computer having an operating system, such as Microsoft® Windows® or Apple® Mac OS® or LINUX, and which is programmed as described below so as to perform particular functions and, in effect, become a special purpose computer when performing these functions.

As shown in FIG. 1, computer 200 executes a print preview service which accepts information from printer 100 to generate a print preview for display on printer 100 or on remote display device 150, as discussed more fully below.

While FIG. 1 depicts computer 200 as a desktop, computing equipment for practicing aspects of the present disclosure can be implemented in a variety of embodiments, including, for example, ultra-mobile computers, netbooks, or game consoles, among many others. In addition, computer 200 may be a server which does not include all of the hardware shown in FIG. 1. For example, the server may not be attached to a monitor, a keyboard, or a mouse.

Computer 200 also includes computer-readable memory media, such as fixed disk 55 (shown in FIG. 3), which is constructed to store computer-readable information, such as computer-executable process steps or a computer-executable program for causing computer 200 to determine whether printer 100 supports a native print preview function capable of displaying a visually acceptable print preview, as described more fully below.

Display device 150 is an example of an alternate display device which can display a print preview on behalf of printer 100. As shown in FIG. 1, display device 150 is architected as cellular telephone, although other types of devices such as a laptop, netbook, a desktop PC, a personal digital assistant (PDA), a tablet, a portable media player, an e-reader or a projector could also serve as an alternate display device, among many others. In that regard, any of the above devices could function as a portable mobile device.

Display device 150 may have advantages over a printer in regards to displaying a print preview. For example, printer 100 may only display characters, whereas display device 150 may provide a more robust display of graphics and text. In addition, even if the display device 150 has similar print preview display capabilities as that of printer 100, if display device 150 is embodied as a cellular telephone as shown, display device 150 offers portability and mobility to the viewer of the print preview. In other words, the viewer can view the print preview at a location remote from the printer, and may be able to change locations while still viewing the preview. Of course, the precise nature of the advantages provided by display device 150 may vary based on the architecture of display device 150. For example, a laptop or netbook could have significantly better print preview display quality than a cellular telephone.

A network 250 transmits data between printer 100, display device 150 and computer 200. The implementation, scale and hardware of the network may vary according to different embodiments. Thus, for example, the network could be the Internet, a Local Area Network (LAN), Wide Area Network (WAN), Metropolitan Area Network (MAN), or Personal Area Network (PAN), among others. The network can be wired or wireless, and can be implemented, for example, as an Optical fiber, Ethernet, or Wireless LAN network. In addition, the network topology of the network may vary.

For purposes of conciseness, only three devices (namely, printer 100, display device 150 and computer 200) are shown in FIG. 1, but any number and type of devices may exist on the network. In particular, it should be appreciated that a much larger and more diverse assortment of display devices or printers may exist on the network, as well as additional devices providing a variety of background services and/or content, as discussed more fully below. For example, another embodiment in which an alternate display device acts as an extension of user interfaces of multiple printers will be discussed more fully below with respect to FIG. 8.

Figure 2:
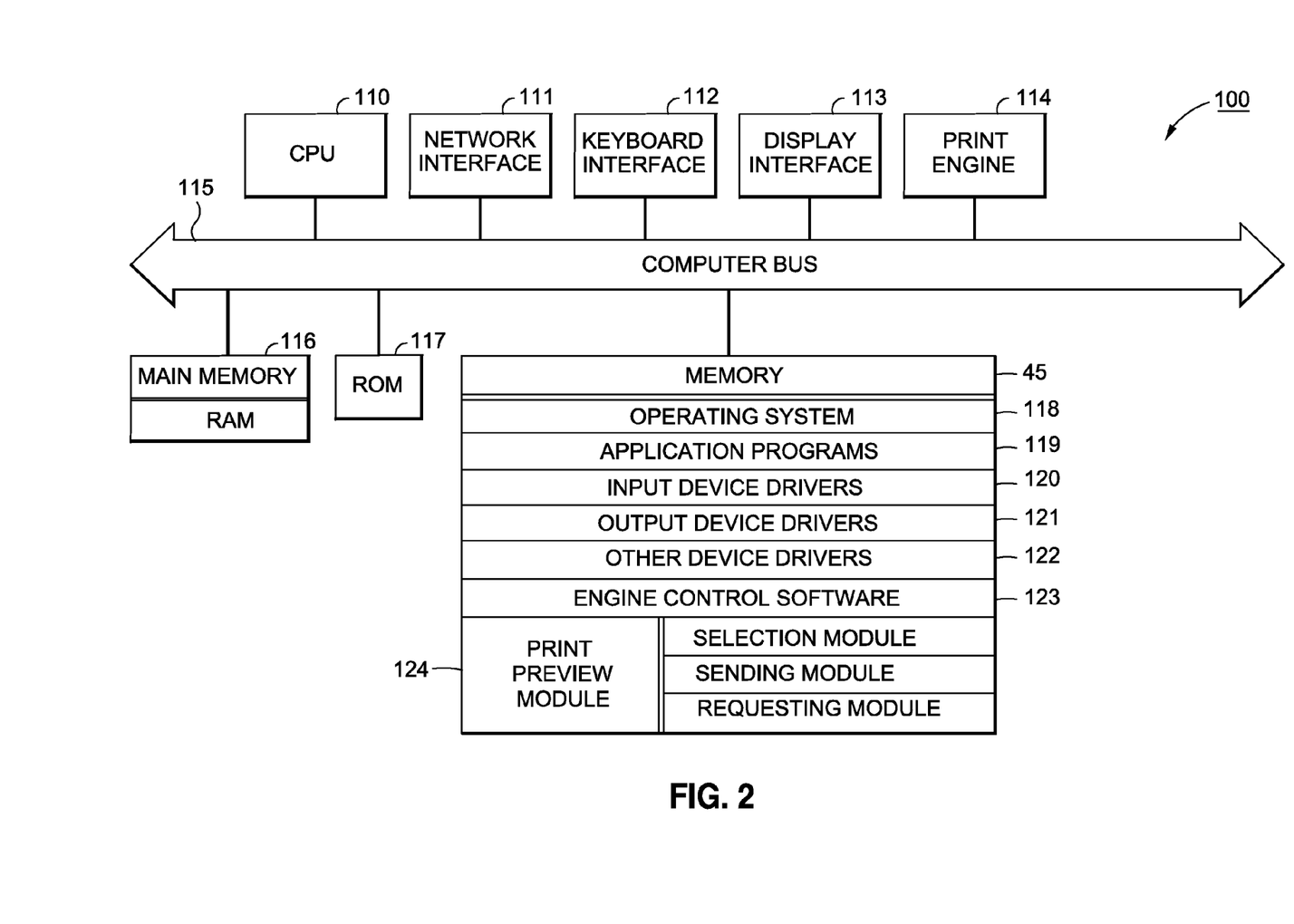
FIG. 2 is a detailed block diagram depicting an example of the internal architecture of the printer shown in FIG. 1.

FIG. 2 is a detailed block diagram depicting an example of the internal architecture of the printer 100 shown in FIG. 1.

As shown in FIG. 2, printer 100 includes central processing unit (CPU) 110 which interfaces with computer bus 115. Also interfacing with computer bus 115 are memory 45, network interface 111, random access memory (RAM) 116 for use as a main run-time transient memory, read only memory (ROM) 117, keyboard interface 112 for input keys or other user interface elements on printer 100, and display interface 113 for a display unit of printer 100. Printer 100 also includes print engine 114 for generating a printed image from print control signals.

RAM 116 interfaces with computer bus 115 so as to provide information stored in RAM 116 to CPU 110 during execution of the instructions in software programs such as an operating system, application programs, and a print preview module. More specifically, CPU 110 first loads computer-executable process steps from memory 45, or another storage device into a region of RAM 116. CPU 110 can then execute the stored process steps from RAM 116 in order to execute the loaded computer-executable process steps. Data such as rendered print data or other information can be stored in RAM 116, so that the data can be accessed by CPU 110 during the execution of computer-executable software programs, to the extent that such software programs have a need to access and/or modify the data.

As also shown in FIG. 2, memory 45 contains computer-executable process steps for operating system 118. Memory 45 may be architected as, for example, a PROM or EEPROM, among many other architectures. Memory 45 also contains computer-executable process steps for application programs 119, and for device drivers for software interface to devices or elements on the printer 100, such as input device drivers 120, output device drivers 121, and other device drivers 122. In some cases, operating system 118 may be a special-purpose operating system which interfaces with hardware directly without the need for separate drivers. Engine control software 123 controls operation of print engine 114.

Print preview module 124 comprises computer-executable process steps, and generally comprises a selection module, a sending module, and a requesting module. Print preview module 124 inputs user selections and requests generation of a print preview, for a display at printer 100 or elsewhere. More specifically, print preview module 124 comprises computer-executable process steps executed by a computer for causing the computer to perform a method for accepting a selection of a document to be printed, sending a request for the selected document to a remote print preview service, and requesting generation of a preview, as described more fully below.

The computer-executable process steps for print preview module 124 may be configured as a part of operating system 118, as part of an output device driver such as a display driver, or as a stand-alone application program such as a print management system. They may also be configured as a plug-in or dynamic link library (DLL) to the operating system, device driver or application program. For example, print preview module 124 according to example embodiments may be embedded in the firmware of an printer 100, or provided in a stand-alone print preview application for use on printer 100. In one example embodiment described herein, print preview module 124 is incorporated directly into the operating system for printer 100. It can be appreciated that the present disclosure is not limited to these embodiments and that the disclosed print preview module 124 may be used in other environments in which print preview is used.

Figure 3:
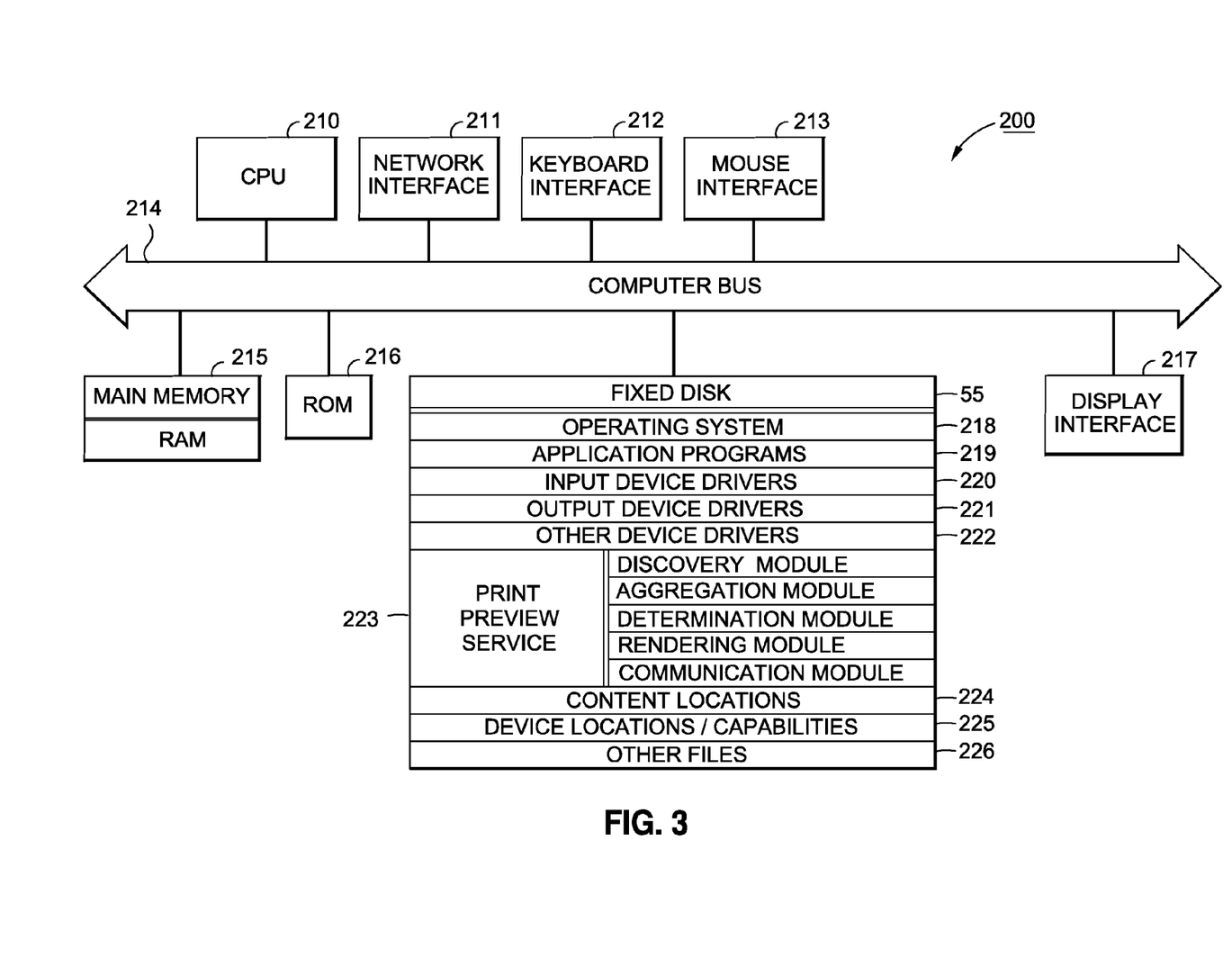
FIG. 3 is a detailed block diagram depicting an example of the internal architecture of the computing equipment shown in FIG. 1.

FIG. 3 is a detailed block diagram depicting an example of the internal architecture of the computer 200 hosting the print preview service, as shown in FIG. 1.

As shown in FIG. 3, computer 200 includes central processing unit (CPU) 210 which interfaces with computer bus 214. Also interfacing with computer bus 214 are fixed (hard) disk 55, network interface 211, random access memory (RAM) 215 for use as a main run-time transient memory, read only memory (ROM) 216, display interface 217 for a monitor or other display unit of computer 200, keyboard interface 212 for a keyboard or similar input device, and mouse interface 213 for a pointing device or other input device.

RAM 215 interfaces with computer bus 214 so as to provide information stored in RAM 215 to CPU 210 during execution of the instructions in software programs such as an operating system, application programs, a print preview service, and device drivers. More specifically, CPU 210 first loads computer-executable process steps from fixed disk 55, or another storage device into a region of RAM 215. CPU 210 can then execute the stored process steps from RAM 215 in order to execute the loaded computer-executable process steps. Data such as device locations or capabilities or other information can be stored in RAM 215, so that the data can be accessed by CPU 210 during the execution of computer-executable software programs, to the extent that such software programs have a need to access and/or modify the data.

As also shown in FIG. 3, fixed disk 55 contains computer-executable process steps for operating system 218, and application programs 219, such as content management programs. Fixed disk 55 also contains computer-executable process steps for device drivers for software interface to devices, such as input device drivers 220, output device drivers 221, and other device drivers 222. Content locations 224 may store locations of content sources on the network, such as devices storing documents. Device locations/capabilities 225 may store the locations of devices such as printers and display devices, and corresponding capabilities such as display capabilities. Other files 226 are available for output to various devices and for manipulation by application programs.

Print preview service 223 comprises computer-executable process steps, and generally comprises a discovery module, an aggregation module, a determination module, a rendering module, and a communication module. Print preview service 223 inputs a request for a document to be printed from a printer, and determines whether the printer supports a native print preview function capable of displaying a visually acceptable print preview on a display unit of the printer. Print preview service 223 also may enlist other devices on the cloud or on the network for background services, such as discovery and aggregation of content and device capabilities on the network, and may also enlist other devices on the cloud or on the network for output services such as rendering a print preview image for display on a display device.

The computer-executable process steps for print preview service 223 may be configured as a part of operating system 218, as part of an output device driver such as a printer driver, or as a stand-alone application program such as a print management system. They may also be configured as a plug-in or dynamic link library (DLL) to the operating system, device driver or application program. For example, print preview service 223 according to example embodiments may be incorporated in an output device driver for execution in a computing device, such as a printer driver, or provided in a stand-alone print management application for use on a general purpose computer. It can be appreciated that the present disclosure is not limited to these embodiments and that the disclosed print preview service 223 may be used in other environments.

Figure 4:
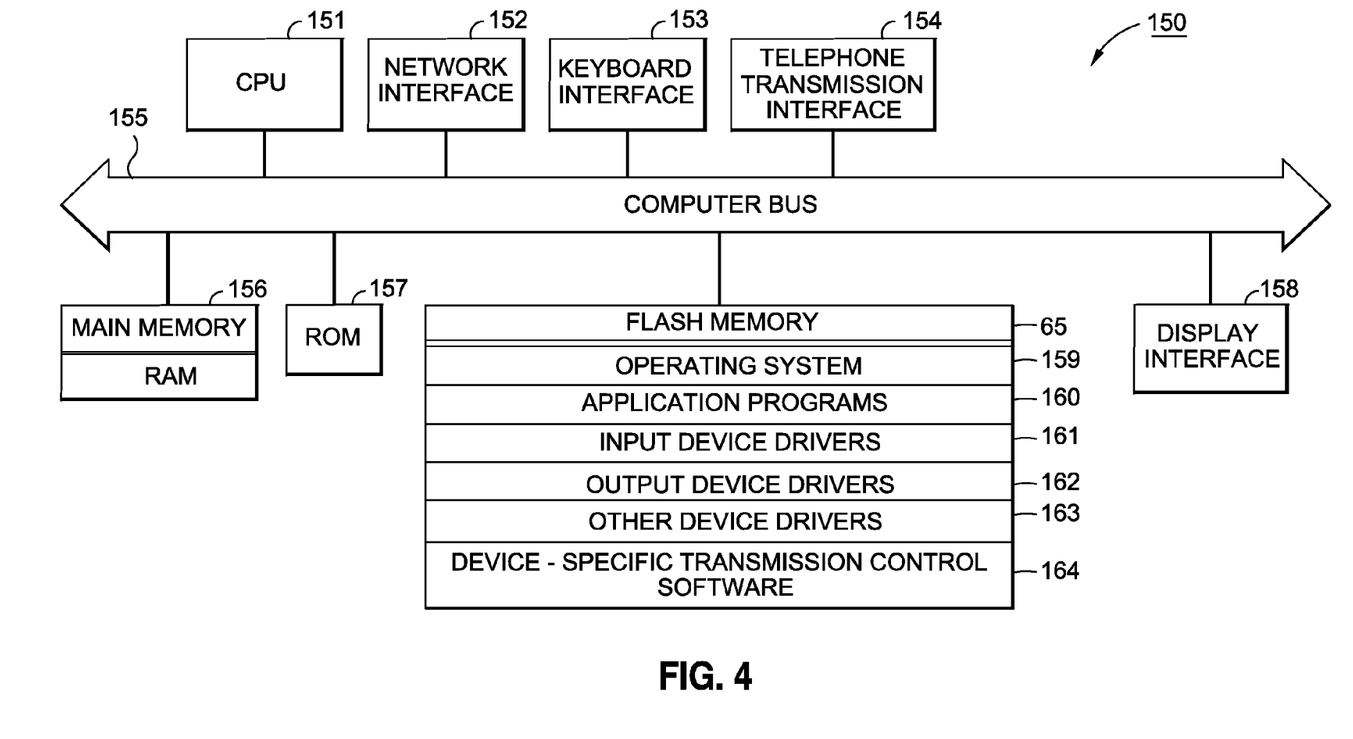
FIG. 4 is a detailed block diagram depicting an example of the internal architecture of the display device shown in FIG. 1.

FIG. 4 is a detailed block diagram depicting an example of the internal architecture of the display device shown in FIG. 1.

As shown in FIG. 4, display device 150 includes central processing unit (CPU) 151 which interfaces with computer bus 155. Also interfacing with computer bus 155 are flash memory 65, network interface 152, random access memory (RAM) 156 for use as a main run-time transient memory, read only memory (ROM) 157, display interface 158 for a screen or other display device, keyboard interface 153 for a keyboard, touchscreen or other input device, and telephone transmission interface 154 for communication over a telephone network.

RAM 156 interfaces with computer bus 155 so as to provide information stored in RAM 156 to CPU 151 during execution of the instructions in software programs such as an operating system, application programs, print preview modules, and device drivers. More specifically, CPU 151 first loads computer-executable process steps from flash memory 65, or another storage device into a region of RAM 156. CPU 151 can then execute the stored process steps from RAM 156 in order to execute the loaded computer-executable process steps. Data such as preview images or other information can be stored in RAM 156, so that the data can be accessed by CPU 151 during the execution of computer-executable software programs, to the extent that such software programs have a need to access and/or modify the data.

As also shown in FIG. 4, flash memory 65 contains computer-executable process steps for operating system 159, and application programs 160, such as print preview display programs. Flash memory 65 also contains computer-executable process steps for device drivers for software interface to devices, such as input device drivers 161, output device drivers 162, and other device drivers 163. In some cases, operating system 159 may be a special-purpose operating system which interfaces with hardware without the need for separate drivers. Device-specific transmission control software 164 controls transmission of data over networks specific to the device (e.g., a telephone transmission network for a telephone).

While a flash memory is depicted in FIG. 4, it should be understood that numerous other types of memories are possible depending on the architecture of display device 150.

Figure 5:
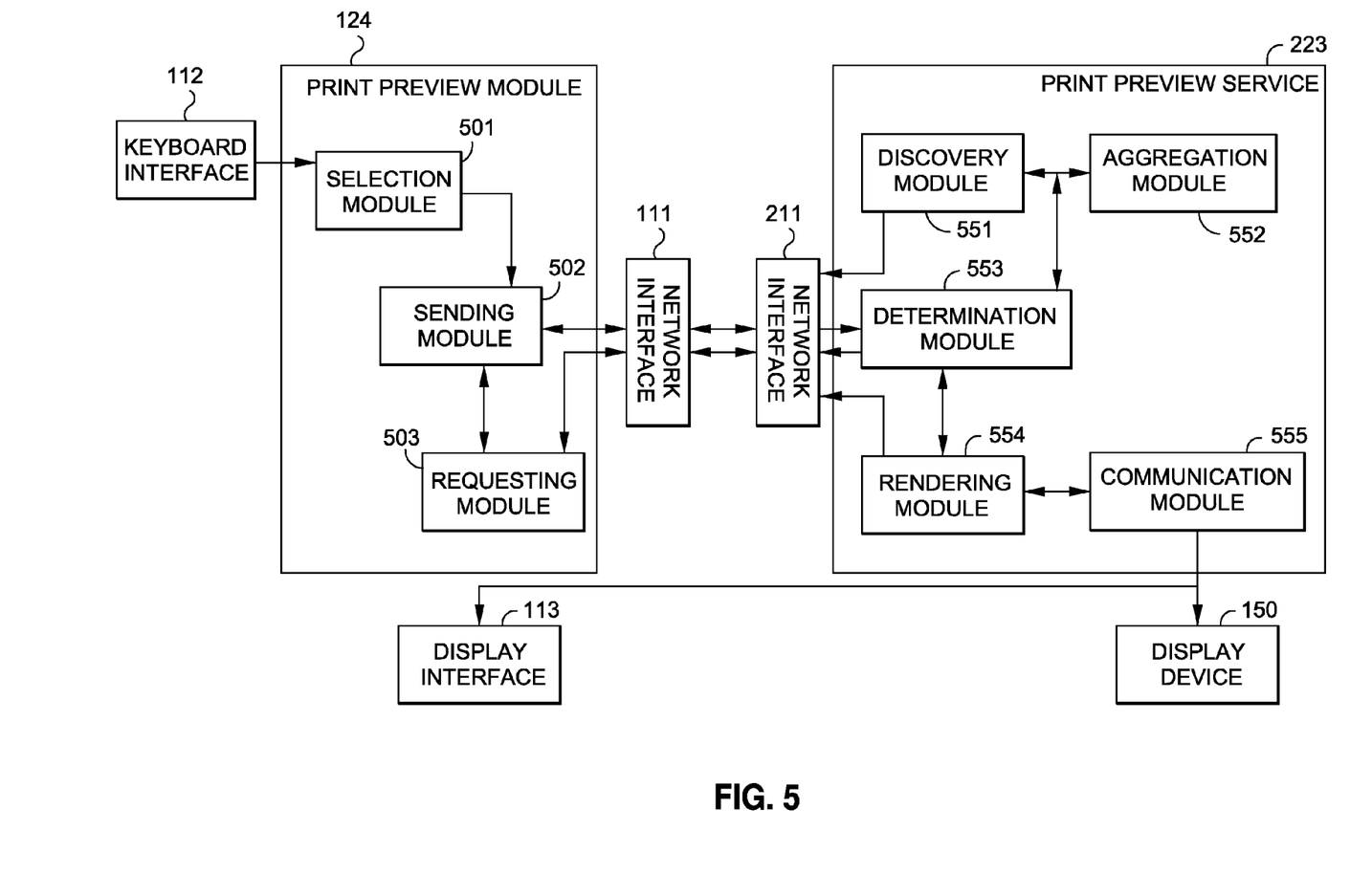
FIG. 5 is a representational view of a print preview module and a print preview service according to an example embodiment.

FIG. 5 is a representational view of a print preview module 124 of printer 100 and a print preview service 223 of computer 200 according to an example embodiment.

In particular, FIG. 5 illustrates an examples of print preview module 124 and print preview service 223, in which the sub-modules of print preview module 124 are included in memory 45 of printer 100, and in which the sub-modules of print preview service 223 are included in fixed disk 55 of computer 200. Each of the sub-modules are computer-executable software code or process steps executable by a processor, such as CPU 110 or CPU 210, and are stored on a computer-readable storage medium, such as memory 45 or fixed disk 55, or RAM 116 or RAM 215. More or fewer modules may be used, and other architectures are possible.

As shown in FIG. 5, print preview module 124 includes selection module 501, sending module 502, and requesting module 503. Meanwhile, print preview service 223 includes discovery module 551, aggregation module 552, determination module 553, rendering module 554, and communication module 555.

Selection module 501 is for accepting a selection of a document to be printed by the printer. To that end, selection module 501 communicates with keyboard interface 112, to accept user selections of keys (or another input device) to designate the document. Selection module 501 transmits the selection to sending module 502.

Sending module 502 is for sending a request for the selected document from the printer to a remote print preview service. Accordingly, sending module 502 communicates with selection module 501 to receive the selection, and further communicates with determination module 553, located remotely at the print preview service 223.

Requesting module 503 is for requesting the remote print service to generate a print preview. Requesting module 503 may also communicate with determination module 553 at print preview service 223, to receive a determination of whether the printer 100 supports a native print preview function capable of displaying a visually acceptable print preview on a display unit of the printer 100. In one example embodiment, in a case where the printer 100 supports a native print preview function capable of displaying a visually acceptable print preview, requesting module 503 requests remote print preview service 223 to generate a native print preview compatible with the capabilities of the printer and to transmit the generated native print preview to the printer. On the other hand, in a case where the printer 100 does not support a native print preview function capable of displaying a visually acceptable print preview, requesting module 503 requests remote print preview service 223 to generate a print preview for an alternate display device which supports print preview (e.g., display device 150) according to the capabilities of the alternate display device, and to transmit the generated print preview to the alternate display device.

Discovery module 551 is for discovering content such as documents on the network, as well as devices on the network and their corresponding capabilities. To that end, discovery module 551 communicates with network interface 211. Discovery module 551 also communicates with aggregation module 552, which aggregates the contents and corresponding content sources, printers and their corresponding capabilities, and display devices and their capabilities.

Determination module 553 determines whether printer 100 supports a native print preview function capable of displaying a visually acceptable print preview on a display unit of the printer. Determination module 553 returns this determination to sending module 502 and/or requesting module 503. Determination module 553 also communicates with rendering module 554.

Rendering module 554 renders a print preview according to the capabilities of the device to display the preview. The print preview may be rendered locally by computer 200 if possible, or by enlisting the aid of rendering devices on the network discovered by discovery module 551. In some cases, e.g., if printer 100 supports a native print preview function capable of displaying a visually acceptable print preview, rendering module 554 may render a print preview according to the capabilities of printer 100. On the other hand, if printer 100 does not support an adequate print preview, rendering module 554 may render a print preview according to the capabilities of an alternate display device, such as display device 150. Rendering module 554 then transmits the rendered print preview to communication module 555, which transmits the print preview to printer 100 or display device 150. Each of the above processes will be described more fully below.

Figure 6:
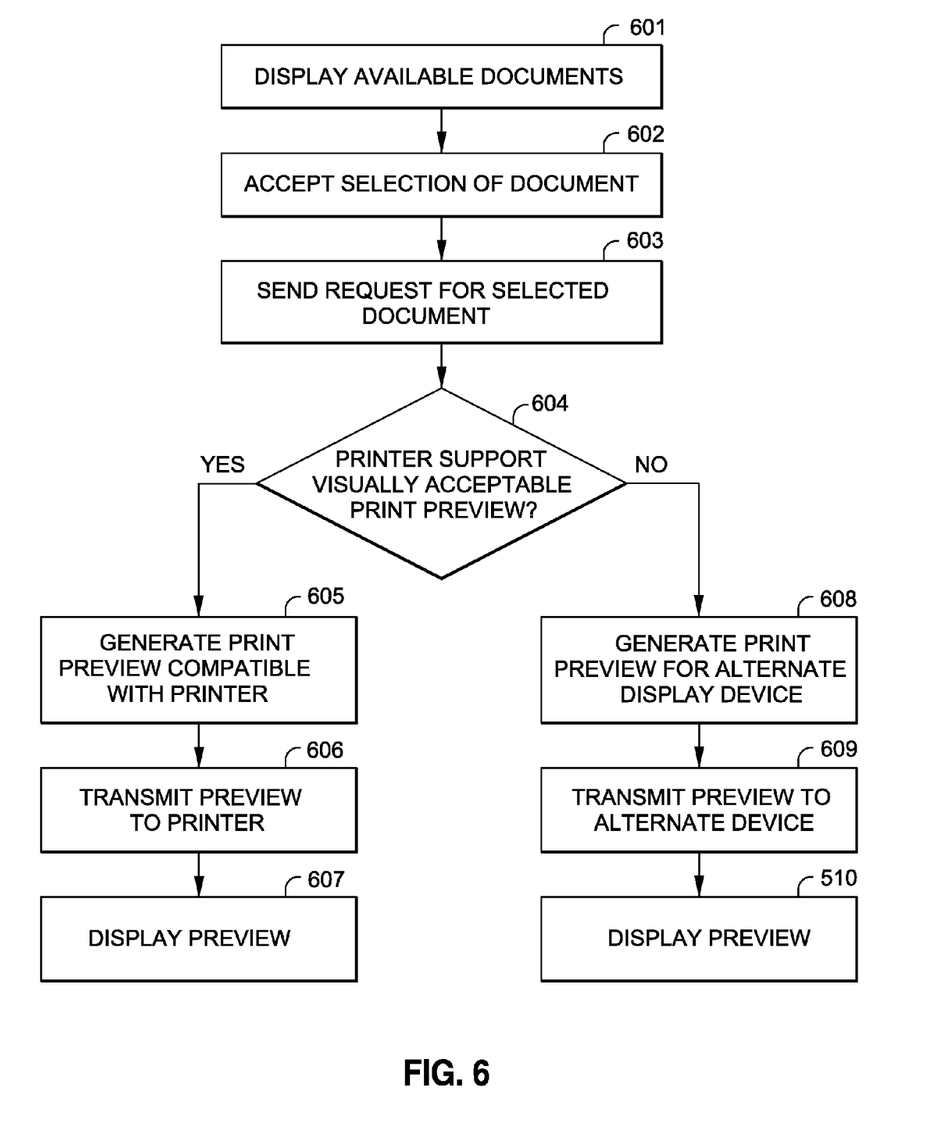
FIG. 6 is a flow diagram for explaining processing in the environment shown in FIG. 1 according to an example embodiment.

FIG. 6 is a flow diagram for explaining processing in the environment shown in FIG. 1 according to an example embodiment.

Briefly, in FIG. 6, a print preview is displayed for a printer on a network. A selection of a document to be printed by the printer is accepted, and a request for the selected document is sent from the printer to a remote print preview service. There is a determination of whether the printer supports a native print preview function capable of displaying a visually acceptable print preview on a display unit of the printer. If the printer supports such a native print preview function, the printer requests the remote print preview service to generate a native print preview compatible with the capabilities of the printer and to transmit the generated native print preview to the printer. If the printer does not support such a native print preview function, the printer requests the remote print preview service to generate a print preview for an alternate display device, and to transmit the generated print preview to the alternate display device.

In more detail, in step 601, available documents for print are displayed on a display unit of the printer, for a selection of a document to be printed by the printer.

In that regard, the list of available documents may be provided from the remote print preview service to the printer, prior to document selection at the printer. For example, when a user selects to start a print process, the printer 100 may send a print notification to the remote print preview service at computer 200. This print notification may trigger the remote print preview service to send a list of available documents to printer 100, for selection in step 601.

The list of available documents, in turn, may be gathered by background services provided by the remote print preview service. These background services include, for example, discovery and aggregation of locations of content such as documents and corresponding content sources, display devices and corresponding display capabilities, and available printers, as well as available rendering devices, among others. This discovery and aggregation may be triggered by receipt of the print notification, or may occur earlier, e.g., upon activation of the remote print preview service. In addition, such discovery and aggregation may be ongoing.

Thus, in this embodiment, capabilities of devices on the network and location information of documents stored on the network are aggregated at the remote print preview service, and the remote print preview service executes on an information processing apparatus remote from the printer.

Numerous methods of discovery and aggregation of content and devices are available. For example, in one example embodiment, discovery and aggregation may be accomplished via an XCFR framework, as described, for example, in U.S. application Ser. No. 12/824,112, filed Jun. 25, 2010, titled "Providing Content To Client Device", by Ravichandran Ragunathan et al., and in U.S. application Ser. No. 12/717,862, filed Mar. 4, 2010, titled "Synchronizing Services Across Network Nodes", by Ravichandran Ragunathan et al, the contents of each of which are incorporated by reference herein. For purposes of conciseness, other discovery and aggregation methods will not be described in further detail.

In step 602, the printer accepts a selection of a document to be printed, from the list provided in step 601. For example, a user may select a document to be printed from a basic drop-down menu at the printer. If available, print preview options for the document may also be accepted at the printer.

In step 603, the printer sends a request for the selected document to the remote print preview service (e.g., on computer 200).

Upon receiving the selection of the document, the remote print preview service may obtain the selected document from a remote document source, for example using the aggregated locations of content sources.

In step 604, the remote print preview service determines whether the printer supports a native print preview function capable of displaying a visually acceptable print preview on a display unit of the printer.

In this regard, the determination of whether the printer supports a native print preview function capable of displaying a visually acceptable print preview is based on the capabilities of the display unit of the printer. For example, the remote print preview service may access the set of display devices and corresponding capabilities gathered through the discovery/aggregation process, including those of printer 100, and compare the capabilities the display unit of each device (including printer 100) against document requirements such as landscape or color printing as well as against other criteria such as a minimum resolution or a display size. In addition, device capabilities may also be compared against print preview options for the document previously accepted at the printer. In this regard, the capabilities of the printer or of the alternate display device may include size of a display screen, resolution of the display screen, or supported display formats, among many others.

In a case where the printer supports a native print preview function capable of displaying a visually acceptable print preview, the process proceeds to step 605. On the other hand, in a case where the printer does not support a native print preview function capable of displaying a visually acceptable print preview, the process proceeds to step 608.

User selection may also play a role in which display device ultimately displays the print preview, and this selection may take into account whether or not the printer can display the preview itself. In particular, a user may be able to use the printer to select from a list of preview display devices, and this list of devices may or may not include the printer itself depending on the outcome of the determination of step 604. Thus, the available preview display device selections incorporate the determination of whether the printer can display a visually acceptable print preview.

Specifically, the remote print preview service may transmit a list to printer 100 of available devices which are capable of displaying a visually acceptable print preview, i.e., meeting the requirements of the document and any selected or predetermined print preview options. If there has been a determination that the printer does not support a native print preview function capable of displaying a visually acceptable print preview, the printer is simply not included this list of devices. Thus, in such a case, the printer is necessarily excluded from being an available display device. Upon viewing the list of available devices, a user can then select a desired alternate display device from the list. Accordingly, in this example, the remote print preview service decides the alternate display device based on communication with the printer, and in particular based on a selection made at the printer.

Returning to FIG. 6, in step 605 (e.g., in the case the printer can display an acceptable print preview), a print preview is generated that is compatible with the printer. In particular, the printer requests the remote print preview service to generate a native print preview compatible with the capabilities of the printer and to transmit the generated native print preview to the printer, and the remote print preview service generates the appropriate native print preview.

In that regard, the print preview could be rendered locally at the device executing the remote print preview service (e.g., computer 200) if that device has appropriate capabilities. Alternatively, the preview could be rendered remotely at another device discovered during the discovery and aggregation process.

In addition, the preview might reflect capabilities of the selected display device (here, printer 100). For example, if printer 100 has a small display screen, it might be wasteful to generate and transmit a preview of the entire document. Accordingly, the rendered preview could selectively narrow down the preview to a particular area. Alternatively, the user could pre-select to preview only a certain number of pages. Other ways of tailoring the preview image to the display device are possible, including, for example, displaying thumbnail images instead of full images.

In step 606, the generated print preview is transmitted to the printer.

In step 607, the printer displays the generated print preview.

Returning to step 604, in the case that it is determined the printer does not support a native print preview function capable of displaying a visually acceptable print preview, the process proceeds to step 608.

In step 608, a print preview is generated for an alternate display device, such as display device 150. In particular, the printer requests the remote print preview service to generate a print preview for an alternate display device which supports print preview according to the capabilities of the alternate display device and to transmit the generated print preview to the alternate display device, and the remote print preview service generates the appropriate native print preview.

As above, the preview could be rendered locally at the device executing the remote print preview service (e.g., computer 200) if that device has appropriate capabilities. Alternatively, the preview could be rendered remotely at another device discovered during the discovery and aggregation process.

As also above, the preview might reflect capabilities of the selected display device (here, the display device 150). For example, if display device 150 is a cellular telephone, it might be wasteful to generate and transmit a preview of the entire document. Accordingly, the rendered preview could selectively narrow down the number of pages of the document to preview. Alternatively, the user could pre-select to preview only a certain number of pages. Other ways of tailoring the preview image to the display device are possible, including, for example, displaying thumbnails instead of full images.

In step 609, the generated print preview is transmitted to the alternate display device.

In step 610, the alternate display device displays the generated preview.

Figure 7:
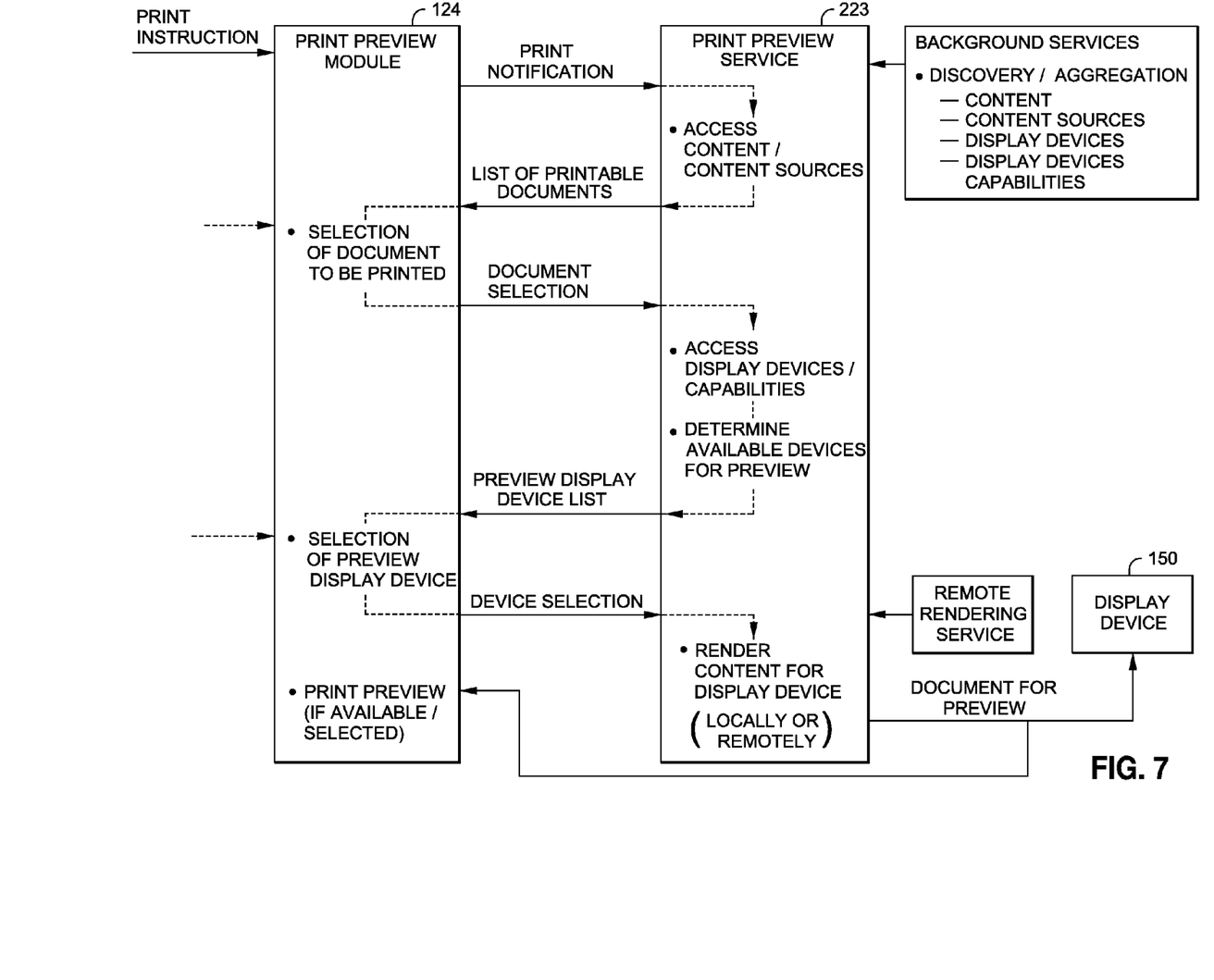
FIG. 7 is a view for explaining interactions between a print preview module, a print preview service and a display device according to an example embodiment.

FIG. 7 is a view for explaining interactions between print preview module 124, print preview service 223 and display device 150 according to an example embodiment.

As seen in FIG. 7, the printer 100 receives a print instruction, and print preview module 124 correspondingly transmits a print notification to the remote print preview service at computer 200. Meanwhile, the print preview service 223, either in response to the print notification or beforehand, performs background services such as discovery and aggregation of content and content sources, and display devices and their capabilities. In response to the print notification from print preview module 124, print preview service 223 accesses content and content sources, and transmits a list of printable documents to printer 100. Then, there is a selection at printer 100 of a document to be printed, and the document selection is transmitted to print preview service 223 by print preview module 124.

Upon receiving the selection of the document, print preview service 223 accesses information of display devices and corresponding capabilities. In addition, based on the requirements of the document, any print preview options selected at printer 100, and/or certain minimum thresholds for capabilities such as resolution or display size, print preview service 223 determines available devices for displaying a preview (which may or may not include printer 100). This list of preview display devices is sent back to printer 100, where a selection is made of a preview display device from the list. The selection is transmitted from preview module 124 back to print preview service 223.

Upon receiving the selection of the device, print preview service 223 renders a preview for the selected device. This rendering may be accomplished locally at the same device executing print preview service 223, or print preview service 223 may enlist the aid of other devices on the network. Once the preview is completed, it is transferred to display device 150 for display (or printer 100, if printer 100 is available and selected).

Figure 8:
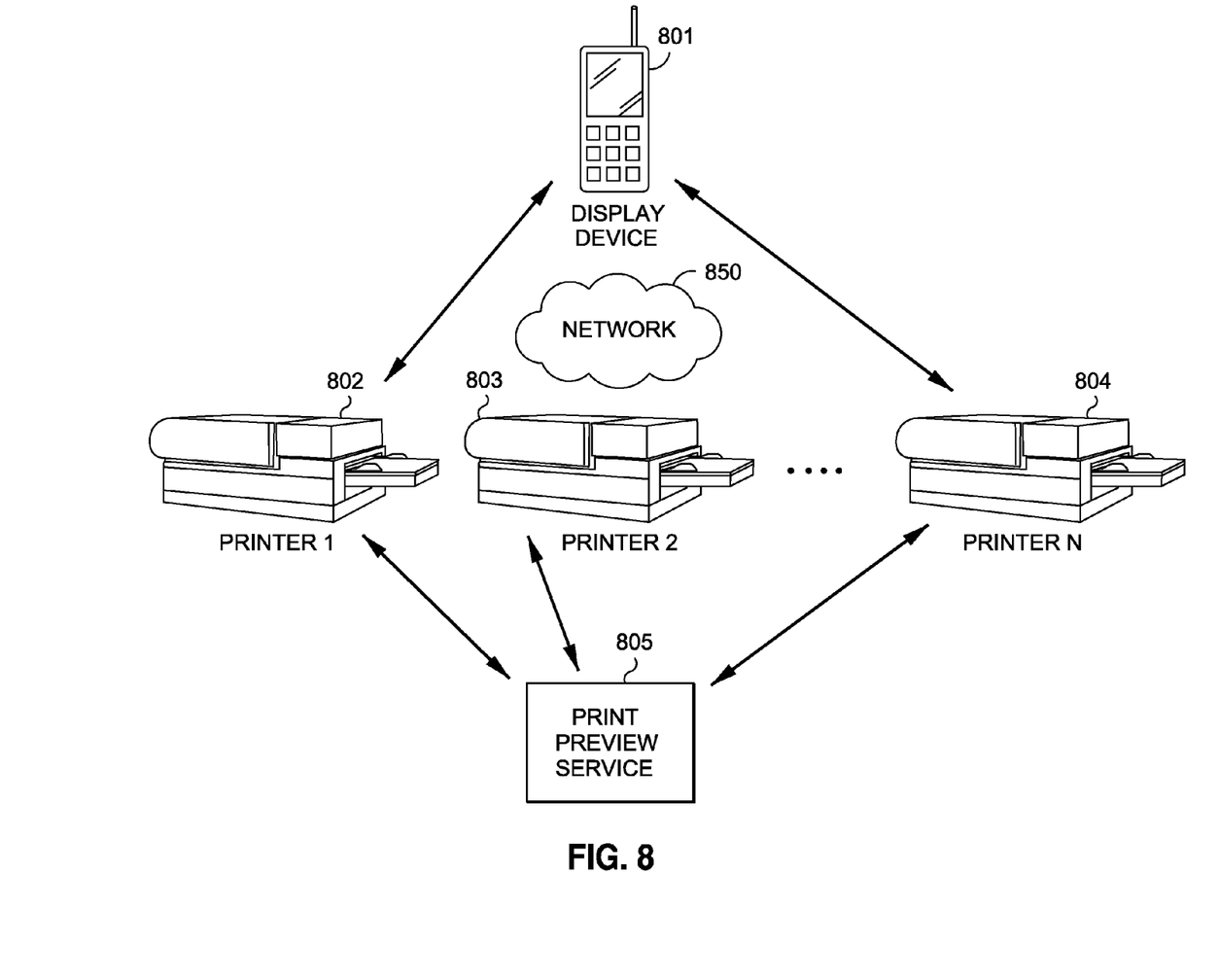
FIG. 8 is a representative view of another example environment in which aspects of the present disclosure may be practiced.

FIG. 8 is a representative view of another example environment in which aspects of the present disclosure may be practiced.

Briefly, in the embodiment of FIG. 8, display device 801 acts as a user interface on behalf of multiple printers 802 to 804, for example to instruct printing and select a printing device, to select a document, or to select a device for previewing. Network 850 transmits data between display device 801, printers 802 to 804, and print preview service 805, and may be implemented similar to network 250 above. In the embodiment shown, display device 801 essentially acts as an extension of the display and UI of one or more printers. Thus, multiple printers and previews therefor can be represented by display device 801, allowing for increased user convenience in a multi-printer environment. Accordingly, display device 801, if portable, can act as a mobile UI remote client, for example to represent multiple printers at a printing store.

For example, a user might walk into a printing store with a display tablet such as an Ipad®. The tablet could detect a network of the printing store, and start an application to display multiple user interfaces for printers at the printing store, or a single user interface representing all of the printers at once. According to the process described above, the user could additionally select a printer, a device (such as the tablet) on which to preview the document, as well as documents to print from either local or remote storage. Meanwhile, the selected printer and the remote print preview service would act essentially the same as described above with respect to FIGS. 5 and 6.

As above, the remote print preview service may transmit a list to a selected printer (and thus to the tablet acting as UI) of available devices which are capable of displaying a visually acceptable print preview, i.e., meeting the requirements of the document and any selected or predetermined print preview options. If there has been a determination that the printer does not support a native print preview function capable of displaying a visually acceptable print preview, the selected printer is simply not included this list of devices. Upon viewing the list of available devices, a user can then select a desired alternate display device from the list, including the tablet itself.

Thus, according to one embodiment, a user interface is displayed by a display device on behalf of multiple printers on the network, for selection of a document to be printed and a printer at which to print the document, and for selection of whether to display the print preview at the display device or the printer. The selection of the selected document is transmitted to the selected printer, and a request is sent for the selected document from the selected printer to a remote print preview service.

In a case where there has been a selection to display the print preview at the selected printer, there is a determination of whether the selected printer supports a native print preview function capable of displaying a visually acceptable print preview on a display unit of the selected printer. In a case where there has been a selection to display the print preview at the selected printer and the printer supports a native print preview function capable of displaying a visually acceptable print preview, the printer requests the remote print preview service to generate a native print preview compatible with the capabilities of the printer and to transmit the generated native print preview to the printer.

However, in a case where there has been a selection to display the print preview at the display device, or in a case where the printer does not support a native print preview function capable of displaying a visually acceptable print preview, the printer requests the remote print preview service to generate a print preview for the display device according to the capabilities of the display device, and to transmit the generated print preview to the display device.

In another example, there may be a case where a user opts to use an alternate display device to display a print preview, regardless of the printer's capability. For example, in a pay-for-print scenario a user may not have physical access to the printer, and might want to see the print preview on their mobile phone even if the printer is fully capable of displaying a visually acceptable print preview.

Thus, according to another embodiment, a print preview is displayed for one or more printers on a network. A user interface is displayed by a display device on behalf of one or more printers on the network, for selection of a document to be printed, and the selection of the selected document is transmitted to the selected printer. A request for the selected document is sent from the selected printer to a remote print preview service. In a case where there has been a selection to display the print preview at the selected printer, the printer requests the remote print preview service to generate a native print preview compatible with the capabilities of the selected printer and to transmit the generated native print preview to the selected printer. In a case where there has been a selection to display the print preview at the display device, the printer requests the remote print preview service to generate a print preview for the display device according to the capabilities of the display device, and to transmit the generated print preview to the display device.

In that regard, the user interface of the display device can also be used for selection of whether to display the print preview at the display device or the selected printer, or at another display device.

In addition, in the case of remote display at the display device, the display device is acting as a display proxy for the printer. Accordingly, in one aspect, the generated print preview can first be transmitted to the printer, and the printer may transmit the generated print preview to the display device. Thus, in this example, the display device obtains the preview image from the printer, rather than directly from the remote print preview service.

By generating a print preview for a remote alternate display device which is capable of displaying a visually acceptable print preview, it is ordinarily possible to provide a print preview which may be superior to a print preview available at the local printer (if any). Moreover, the remote alternate display device can be a portable device such as a cell phone, thereby allowing the user to view the print preview in various locations.

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for displaying a print preview for a printer on a network, comprising:
    accepting a selection of a document to be printed by the printer;
    sending a request for the selected document from the printer to a remote print preview service; and
    determining, by the remote print preview service, whether the printer supports a native print preview function capable of displaying a visually acceptable print preview on a display unit of the printer by comparing capabilities of the display unit of the printer with document requirements,
    wherein in a case where the printer supports a native print preview function capable of displaying a visually acceptable print preview, the printer requests the remote print preview service to generate a native print preview compatible with the capabilities of the printer and to transmit the generated native print preview to the printer; and
    wherein in a case where the printer does not support a native print preview function capable of displaying a visually acceptable print preview, the printer requests the remote print preview service to generate a print preview for an alternate display device which supports print preview according to the capabilities of the alternate display device, and to transmit the generated print preview to the alternate display device.

2. The method according to claim 1, wherein the determination of whether the printer supports a native print preview function capable of displaying a visually acceptable print preview is based on the capabilities of the display unit of the printer.

3. The method according to claim 1, wherein the remote print preview service decides the alternate display device based on communication with the printer.

4. The method according to claim 1, wherein the alternate display device is a cellular telephone.

5. The method according to claim 1, wherein the capabilities of the printer or of the alternate display device may include size of a display screen, resolution of the display screen, or supported display formats.

6. The method according to claim 1, wherein the remote print preview service obtains the selected document from a remote document source.

7. The method according to claim 1, wherein print preview options for the document to be printed are accepted at the printer.

8. The method according to claim 1, wherein capabilities of devices on the network and location information of documents stored on the network are aggregated at the remote print preview service, and wherein the remote print preview service executes on an information processing apparatus remote from the printer.

9. A network printer communicably connected with a remote print preview service, comprising:
    a computer-readable memory constructed to store computer-executable process steps; and
    a processor constructed to execute the computer-executable process steps stored in the memory;
    wherein the process steps stored in the memory cause the processor to:
    accept a selection of a document to be printed; and
    send a request for the selected document to the remote print preview service,
    wherein there is a determination by the remote print preview service of whether the printer supports a native print preview function capable of displaying a visually acceptable print preview on a display unit of the printer by comparing capabilities of the display unit of the printer with document requirements,
    wherein in a case where the printer supports a native print preview function capable of displaying a visually acceptable print preview, the printer requests the remote print preview service to generate a native print preview compatible with the capabilities of the printer and to transmit the generated native print preview to the printer; and
    wherein in a case where the printer does not support a native print preview function capable of displaying a visually acceptable print preview, the printer requests the remote print preview service to generate a print preview for an alternate display device which supports print preview according to the capabilities of the alternate display device, and to transmit the generated print preview to the alternate display device.

10. The printer according to claim 9, wherein the determination of whether the printer supports a native print preview function capable of displaying a visually acceptable print preview is based on the capabilities of the display unit of the printer.

11. The printer according to claim 9, wherein the remote print preview service decides the alternate display device based on communication with the printer.

12. The printer according to claim 9, wherein the alternate display device is a cellular telephone.

13. The printer according to claim 9, wherein the capabilities of the printer or of the alternate display device may include size of a display screen, resolution of the display screen, or supported display formats.

14. The printer according to claim 9, wherein the remote print preview service obtains the selected document from a remote document source.

15. The printer according to claim 9, wherein print preview options for the document to be printed are accepted at the printer.

16. The printer according to claim 9, wherein capabilities of devices on the network and location information of documents stored on the network are aggregated at the remote print preview service, and wherein the remote print preview service executes on an information processing apparatus remote from the printer.

17. A print preview module of a printer and a remote print preview service stored on a non-transitory computer-readable medium, comprising:
a selection module for accepting a selection of a document to be printed by the printer;
a sending module for sending a request for the selected document from the printer to the remote print preview service; and
a requesting module for requesting the remote print preview service to generate a print preview,
wherein there is a determination by the remote print preview service of whether the printer supports a native print preview function capable of displaying a visually acceptable print preview on a display unit of the printer by comparing capabilities of the display unit of the printer with document requirements,
wherein in a case where the printer supports a native print preview function capable of displaying a visually acceptable print preview, the printer requests the remote print preview service to generate a native print preview compatible with the capabilities of the printer and to transmit the generated native print preview to the printer; and
wherein in a case where the printer does not support a native print preview function capable of displaying a visually acceptable print preview, the printer requests the remote print preview service to generate a print preview for an alternate display device which supports print preview according to the capabilities of the alternate display device, and to transmit the generated print preview to the alternate display device.

18. The module according to claim 17, wherein the determination of whether the printer supports a native print preview function capable of displaying a visually acceptable print preview is based on the capabilities of the display unit of the printer.

19. The module according to claim 17, wherein the remote print preview service decides the alternate display device based on communication with the printer.

20. The module according to claim 17, wherein the alternate display device is a cellular telephone.

21. The module according to claim 17, wherein the capabilities of the printer or of the alternate display device may include size of a display screen, resolution of the display screen, or supported display formats.

22. The module according to claim 17, wherein the remote print preview service obtains the selected document from a remote document source.

23. The module according to claim 17, wherein print preview options for the document to be printed are accepted at the printer.

24. The module according to claim 17, wherein capabilities of devices on the network and location information of documents stored on the network are aggregated at the remote print preview service, and wherein the remote print preview service executes on an information processing apparatus remote from the printer.

25. A non-transitory computer-readable storage medium retrievably storing computer-executable process steps for a method for displaying a print preview, the method comprising:
accepting a selection of a document to be printed by a printer; and
sending a request for the selected document from the printer to a remote print preview service,
wherein there is a determination by the remote print preview service of whether the printer supports a native print preview function capable of displaying a visually acceptable print preview on a display unit of the printer by comparing capabilities of the display unit of the printer with document requirements,
wherein in a case where the printer supports a native print preview function capable of displaying a visually acceptable print preview, the printer requests the remote print preview service to generate a native print preview compatible with the capabilities of the printer and to transmit the generated native print preview to the printer; and
wherein in a case where the printer does not support a native print preview function capable of displaying a visually acceptable print preview, the printer requests the remote print preview service to generate a print preview for an alternate display device which supports print preview according to the capabilities of the alternate display device, and to transmit the generated print preview to the alternate display device.

26. The computer-readable storage medium according to claim 25, wherein the determination of whether the printer supports a native print preview function capable of displaying a visually acceptable print preview is based on the capabilities of the display unit of the printer.

27. The computer-readable storage medium according to claim 25, wherein the remote print preview service decides the alternate display device based on communication with the printer.

28. The computer-readable storage medium according to claim 25, wherein the alternate display device is a cellular telephone.

29. The computer-readable storage medium according to claim 25, wherein the capabilities of the printer or of the alternate display device may include size of a display screen, resolution of the display screen, or supported display formats.

30. The computer-readable storage medium according to claim 25, wherein the remote print preview service obtains the selected document from a remote document source.

31. The computer-readable storage medium according to claim 25, wherein print preview options for the document to be printed are accepted at the printer.

32. The computer-readable storage medium according to claim 25, wherein capabilities of devices on the network and location information of documents stored on the network are aggregated at the remote print preview service, and wherein the remote print preview service executes on an information processing apparatus remote from the printer.

* * * * *